United States Patent
Keren

(10) Patent No.: US 12,114,149 B2
(45) Date of Patent: Oct. 8, 2024

(54) VIRTUAL SOUND LOCALIZATION FOR VIDEO TELECONFERENCING

(71) Applicant: DSP Group Ltd., Herzliya (IL)

(72) Inventor: Avraham Keren, Raanana (IL)

(73) Assignee: DSP Group Ltd. (IL)

( * ) Notice: Subject to any disclaimer, the term of this patent is extended or adjusted under 35 U.S.C. 154(b) by 294 days.

(21) Appl. No.: 17/861,876

(22) Filed: Jul. 11, 2022

(65) Prior Publication Data
US 2023/0045569 A1    Feb. 9, 2023

Related U.S. Application Data

(60) Provisional application No. 63/203,941, filed on Aug. 4, 2021.

(51) Int. Cl.
*H04S 7/00* (2006.01)
*H04L 12/18* (2006.01)
*H04N 7/15* (2006.01)

(52) U.S. Cl.
CPC .......... *H04S 7/304* (2013.01); *H04L 12/1822* (2013.01); *H04N 7/15* (2013.01); *H04S 2420/01* (2013.01)

(58) Field of Classification Search
CPC ........ H04S 7/304; H04S 2420/01; H04S 7/30; H04S 2400/11; H04L 12/1822; H04L 12/1827; H04N 7/15; H04N 7/147
USPC ........................................................ 381/300
See application file for complete search history.

(56) References Cited

U.S. PATENT DOCUMENTS

2017/0324931 A1* 11/2017 Sun .......................... H04N 7/15
2022/0394413 A1* 12/2022 Seipp ....................... H04N 7/15

* cited by examiner

*Primary Examiner* — Paul Kim
(74) *Attorney, Agent, or Firm* — Paradice & Li LLP

(57) ABSTRACT

This disclosure provides methods, devices, and systems for videoconferencing. The present implementations more specifically relate to audio signal processing techniques that can be used to identify speakers in a videoconference. In some aspects, an audio signal processor may map each speaker in a videoconference to a respective spatial direction and transform the audio signals received from each speaker using one or more transfer functions associated with the spatial direction to which the speaker is mapped. The audio signal processor may further transmit the transformed audio signals to an audio output device that emits sounds waves having a directionality associated with the transformation. For example, the audio signal processor may apply one or more head-related transfer functions to the audio signals received from a particular speaker so that the sound waves emitted by the audio output device are perceived as originating from the spatial direction to which the speaker is mapped.

16 Claims, 6 Drawing Sheets

VIRTUAL SOUND LOCALIZATION FOR VIDEO TELECONFERENCING

CROSS-REFERENCE TO RELATED APPLICATION

This application claims priority and benefit under 35 USC § 119(e) to U.S. Provisional Patent Application No. 63/203,941, filed on Aug. 4, 2021, which is incorporated herein by reference in its entirety.

TECHNICAL FIELD

The present implementations relate generally to teleconferencing, and specifically to virtual sound localization for video teleconferencing.

BACKGROUND OF RELATED ART

Video teleconferencing (also referred to as "videoconferencing") is a communications technology that allows two or more people to see and hear one another, in near real-time, from different locations. A videoconference can be established by a network of devices or terminals that transmit and receive video and audio signals from multiple participants. For example, each terminal generally includes at least a camera to capture video of a user, a microphone to capture audio from the user, a display component to playback video captured of other participants, and an audio output component to playback audio captured from the other participants.

Advances in videoconferencing technology have resulted in larger videoconferences with increasing numbers of participants. However, in many videoconferences, only one (or a few) participants may be speaking at any given time (also referred to as the "speaker"). As the number of participants in a videoconference increases, the identity of the speaker(s) may become obfuscated. In other words, a user participating in a videoconference with a large number of participants may have difficulty discerning which of the participants is speaking at any given time. Thus, there is a need to improve the user experience associated with videoconferencing.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of processing audio signals. The method includes steps of receiving a first audio signal associated with a videoconference that includes a plurality of participants; detecting a first speaker associated with the first audio signal, where the first speaker is one of the plurality of participants in the videoconference; mapping the first speaker to a first spatial direction; transforming the first audio signal based on one or more transfer functions associated with the first spatial direction; and transmitting the transformed first audio signal to an audio output device.

Another innovative aspect of the subject matter of this disclosure can be implemented in a videoconferencing system, including a processing system and a memory. The memory stores instructions that, when executed by the processing system, cause the videoconferencing system to receive a first audio signal associated with a videoconference that includes a plurality of participants; detect a first speaker associated with the first audio signal, the first speaker being one of the plurality of participants in the videoconference; map the first speaker to a first spatial direction; transform the first audio signal based on one or more transfer functions associated with the first spatial direction; and transmit the transformed first audio signal to an audio output device.

Another innovative aspect of the subject matter of this disclosure can be implemented in a videoconferencing system, including a display device, an audio output device, and an audio signal processor. The display device is configured to display a videoconference that includes a plurality of participants. The audio output device configured to emit sound waves representing audio signals associated with the videoconference. The audio signal processor is configured to receive a first audio signal associated with the videoconference; detect a first speaker associated with the first audio signal, the first speaker being one of the plurality of participants in the videoconference; map the first speaker to a first spatial direction; transform the first audio signal based on one or more transfer functions associated with the first spatial direction; and provide the transformed first audio signal to the audio output device.

BRIEF DESCRIPTION OF THE DRAWINGS

The present implementations are illustrated by way of example and are not intended to be limited by the figures of the accompanying drawings.

DETAILED DESCRIPTION

Figure 1:
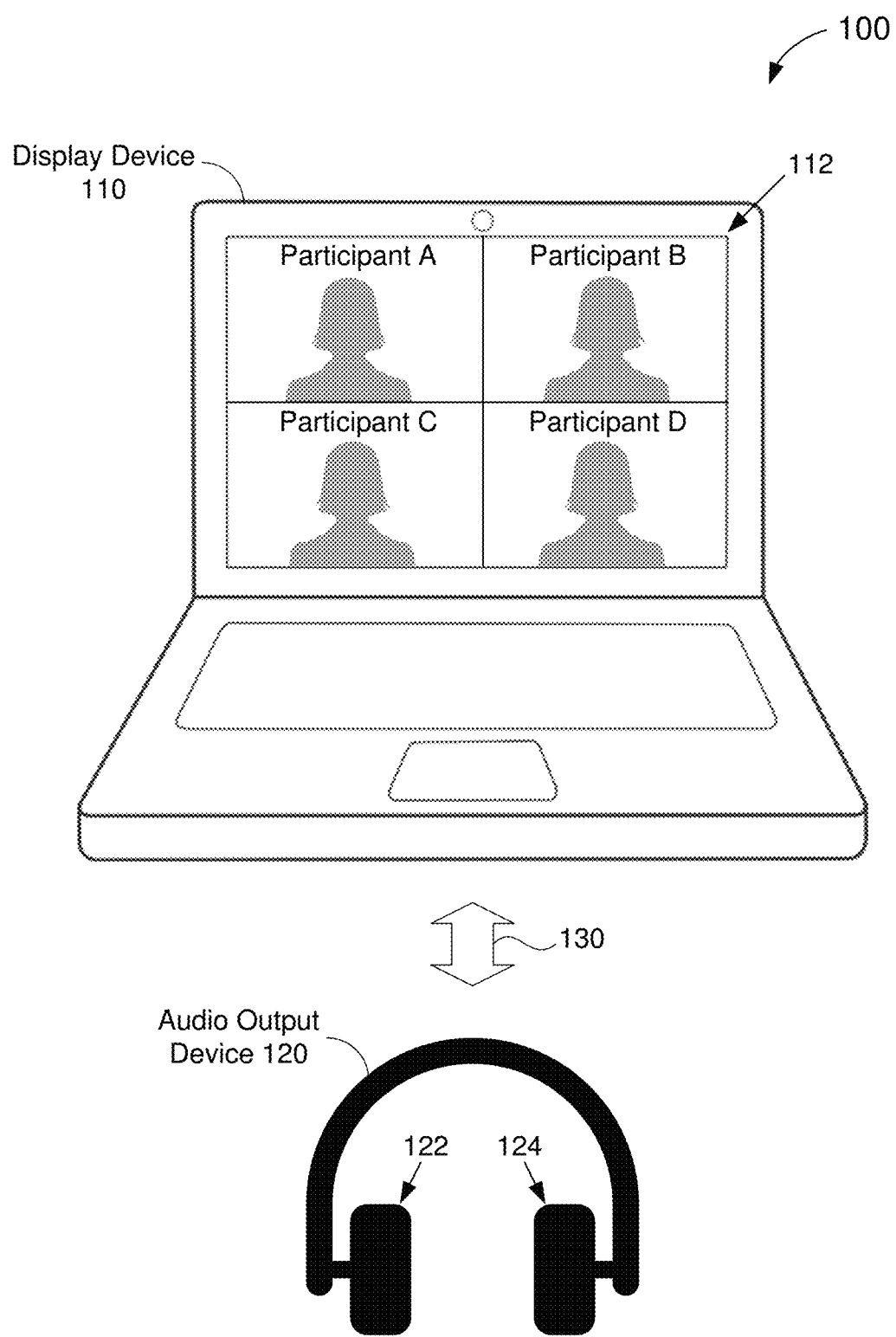
FIG. 1 shows an example videoconferencing system.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a videoconference can be established by a network of devices or terminals that transmit and receive video and audio signals from multiple participants. For example, each terminal generally includes at least a camera to capture video of a user, a microphone to capture audio from the user, a display component to playback video captured of other participants, and an audio output component to playback audio captured from the other participants. Advances in videoconferencing technology have resulted in larger videoconferences with increasing numbers of participants. However, in many videoconferences, only one (or a few) participants may be speaking at any given time (also referred to as the "speaker"). As the number of participants in a videoconference increases, the identity of the speaker(s) may become obfuscated. In other words, a user participating in a videoconference with a large number of participants may have difficulty discerning which of the participants is speaking at any given time.

Aspects of the present disclosure recognize that, in live or in-person meetings humans can identify a speaker based on visual and audio cues. Example visual cues include the speaker's body position, direction of gaze, or lip movement. Example audio cues include a direction of sound originating from the speaker. In a videoconference with many participants, the visual cues of the speaker may be difficult to distinguish from the many other participants that appear to be facing the same direction on the user's display. Moreover, subtle lip movements may be difficult to detect due to size limitations of the display. By contrast, the audio cues of the speaker can be reproduced in the same (or substantially similar) fashion in videoconferences as in-person meetings. For example, a head-related transfer function (HRTF) describes how sound waves are perceived by a listener. When applied to an audio signal, an HRTF can create a sensation of directionality in the sound waves emitted by an audio output device (such as a headset). As such, the listener may perceive the sound waves as originating from a particular direction in space.

Various aspects relate generally to videoconferencing, and more particularly, to audio signal processing techniques that can be used to identify or otherwise distinguish speakers in a videoconference. In some aspects, an audio signal processor may map each speaker in a videoconference to a respective spatial direction (such as up, down, left, right, or any combination thereof) and transform the audio signals received from each speaker using one or more transfer functions associated with the spatial direction to which the speaker is mapped. The audio signal processor may further transmit the transformed audio signals to an audio output device that emits sounds waves having a directionality associated with the transformation. For example, the audio signal processor may apply one or more HRTFs to the audio signals received from a particular speaker so that the sound waves emitted by the audio output device are perceived (by a user of the audio output device) as originating from the spatial direction to which the speaker is mapped. In some implementations, each speaker may be mapped to a spatial direction associated with the speaker's location or position on the user's display.

Particular implementations of the subject matter described in this disclosure can be implemented to realize one or more of the following potential advantages. By transforming audio signals received from each speaker in a videoconference to have directionality that is uniquely associated with the speaker, aspects of the present disclosure may improve the user experience associating with videoconferencing. For example, a user may quickly identify a participant who is speaking based on the direction of the speaker's voice. By mapping the direction of speech to the speaker's position on a user's display, aspects of the present disclosure may further improve social interactions or engagement between participants in the videoconference. For example, the user may look in the direction of speech to quickly locate the speaker on the user's display.

FIG. 1 shows an example videoconferencing system 100. The videoconferencing system 100 includes a display device 110 and an audio output device 120. In some implementations, the videoconferencing system 100 may be configured to receive (and transmit) video and audio data associated with a videoconference. For example, the videoconferencing system 100 may be communicatively coupled to other videoconferencing systems (or terminals) via one or more networks (not shown for simplicity).

The display device 110 is configured to display video associated with a videoconference. The display device 110 may use any type of display technology that can display an image or sequence of images (such as frames of video). Example suitable display technologies may include light emitting diode (LED), organic LED (OLED), cathode ray tube (CRT), liquid crystal display (LCD), plasma, and electroluminescence (EL), among other examples. This includes projective display technologies on refractive, semi-reflective, semi-transparent surfaces such as LCD or silicon. In the example of FIG. 1, the display device 110 is depicted as a laptop computer. However, in actual implementations, other types of display devices can be substituted for the display device 110 (such as televisions, computer monitors, mobile phone displays, and tablet displays, among other examples).

The audio output device 120 is configured to output audio associated with the videoconference. In some implementations, the audio output device 120 may receive audio signals from the display device 110 via a wired, or wireless, connection 130. The audio output device 120 may convert the received audio signals to acoustic sound waves via electroacoustic transducers 122 and 124 (also referred to as "loudspeakers" or "speaker drivers"). For simplicity, only two transducers 122 and 124 are shown in FIG. 1. In some other implementations, the audio output device 120 may include any number of electroacoustic transducers, for example, to support a range of audio frequencies. In the example of FIG. 1, the audio output device 120 is depicted as a stereo headset. However, in actual implementations, other types of audio output devices can be substituted for the audio output device 120 (such as stereo speakers, surround speakers, soundbars, or various speaker arrays).

In some implementations, the display device 110 may receive video data, representing captured video, from multiple participants A-D of the videoconference and merge the captured video for display in a shared display region 112. For example, the display device 110 may display video (or images) of the participants A—D concurrently in the display region 112. As shown in FIG. 1, participant A is displayed in the upper-left of the display region 112, participant B is displayed in the upper-right of the display region 112, participant C is displayed in the lower-left of the display region 112, and participant D is displayed in the lower-right of the display region 112. In the example of FIG. 1, the videoconference is shown to include 5 participants (where the user of the videoconferencing system 100 is not depicted in the display region 112). However, in actual implementations, a videoconference may include fewer or more participants than those depicted in FIG. 1.

In some aspects, the videoconferencing system 100 may be configured to transform audio signals (representing speech) received from any of the participants A-D in a manner that is indicative of the speaker. For example, the videoconferencing system 100 may apply a unique transformation to the audio signals received from each of the participants A-D so that audio signals received from a given participant are perceived differently than audio signals received from any other participants in the videoconference. In some implementations, the transformations applied to the audio signals received from each of the participants A-D may be associated with a respective spatial direction. For example, the videoconferencing system 100 may apply a transfer function (such as an HRTF) to a received audio signal that causes the sound waves emitted by the audio output device 120 to be perceived (by the user) as originating from a given direction in space.

In some implementations, the directionality of an audio signal may be associated with a position of the speaker in the display region 112. For example, audio signals received from participant A may be mapped to an upper-left spatial direction, audio signals received from participant B may be mapped to an upper-right spatial direction, audio signals received from participant C may be mapped to a lower-left spatial direction, and audio signals received from participant D may be mapped to a lower-right spatial direction. As a result, speech originating from participant A may be perceived as coming from above, and to the left, of the user; speech originating from participant B may be perceived as coming from above, and to the right, of the user; speech originating from participant C may be perceived as coming from below, and to the left, of the user; and speech originating from participant D may be perceived as coming from below, and to the right, of the user.

Figure 2:
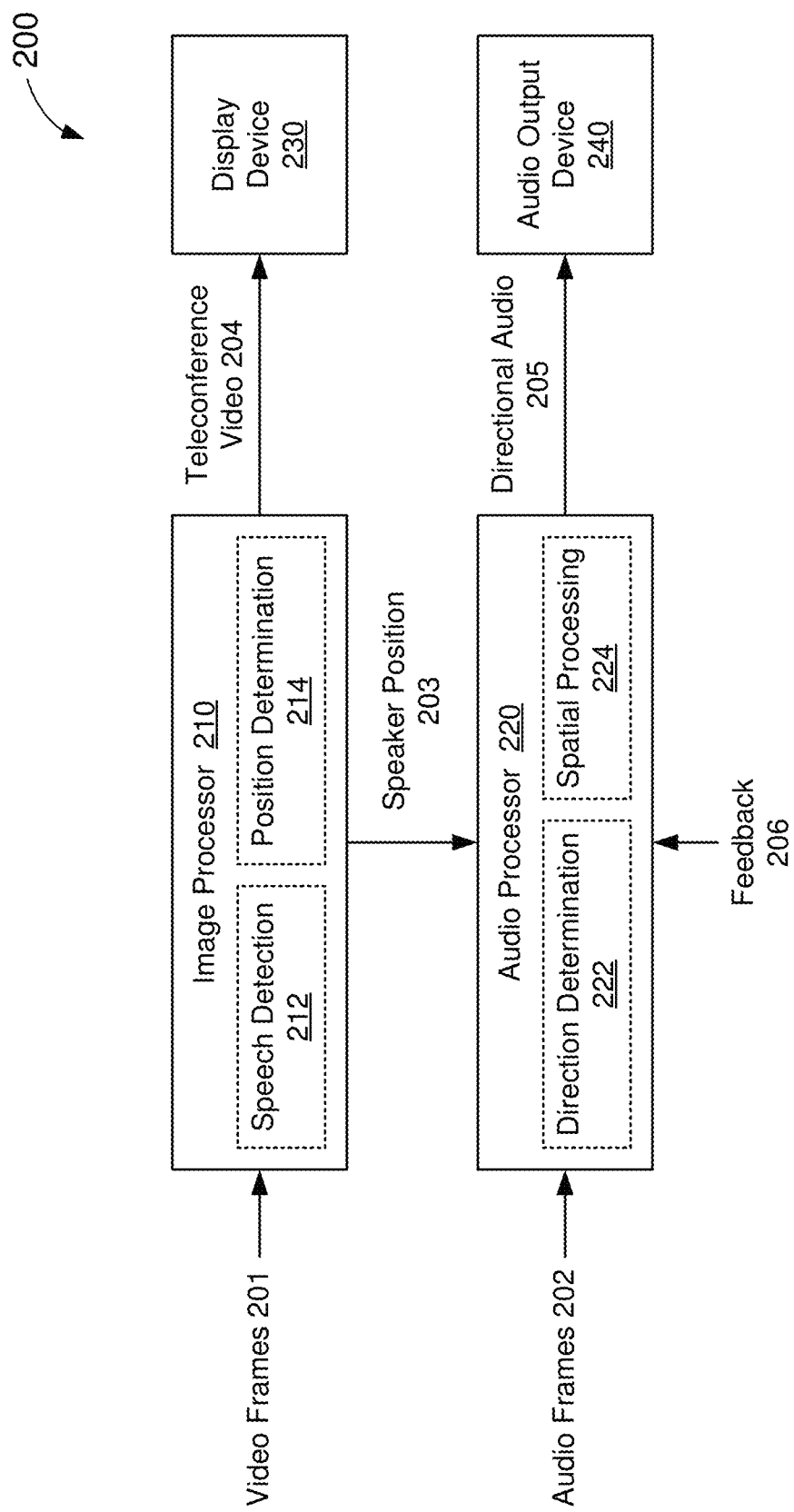
FIG. 2 shows a block diagram of an example videoconferencing system, according to some implementations.

FIG. 2 shows a block diagram of an example videoconferencing system 200, according to some implementations. The videoconferencing system 200 includes an image processor 210, an audio processor 220, a display device 230, and an audio output device 240. In some aspects, the videoconferencing system 200 may be one example of the videoconferencing system 100 of FIG. 1. With reference for example to FIG. 1, the display device 230 may be one example of the display device 110 and the audio output device 240 may be one example of the audio output device 120.

The image processor 210 is configured to process video frames 201 received from each of the participants in a videoconference and output teleconference video 204 to the display device 230. In some implementations, the image processor 210 may combine or merge video frames 201 received from multiple participants of the videoconference into aggregated video frames that can be displayed in a shared display region of the display device 230 (such as the display region 112 of FIG. 1). In other words, each frame of the teleconference video 204 may concurrently depict multiple videoconference participants. In some implementations, the image processor 210 may include a speech detection component 212 and a position determination component 214.

The speech detection component 212 is configured to identify one or more speakers among the participants associated with the received video frames 201. In some implementations, the speech detection component 212 may measure an amount of lip movement by each participant in the videoconference to determine which (if any) of the participants is speaking at any given time. For example, the speech detection component 212 my infer that a participant is speaking if the participant exhibits at least a threshold amount of lip movement. In some implementations, the speech detection component 212 may be trained to infer speech based on a neural network model or other machine learning techniques.

The position determination component 214 is configured to determine a position of each speaker relative to the display device 230. With reference for example to FIG. 1, the position determination component 214 may determine that participant A is located in the upper-left region of the display, participant B is located in the upper-right region of the display, participant C is located in the lower-left region of the display, and participant D is located in the lower-right region of the display. In some implementations, the position determination component 214 may determine the position of each participant based on how the video frames 201 received from each participant are aggregated for display (as teleconference video 204).

The audio processor 220 is configured to process audio frames 202 associated with the videoconference and output directional audio 205 to the audio output device 240. In some aspects, the audio processor 220 may transform the audio frames 202 to indicate the speaker(s) associated therewith. In some implementations, the audio processor 220 may apply a unique transfer function to the audio frames 202 received from each speaker based on a position of the speaker on the display device 230. For example, the audio processor 220 may receive speaker position information 203 from the image processor 210 indicating the position of each speaker on the display device 230. In some implementations, the audio processor 220 may include a direction determination component 222 and a spatial processing component 224.

The direction determination component 222 is configured to map the audio frames 202 received from each speaker to a respective spatial direction. In some implementations, each of the spatial directions may be associated with a position of the respective speaker on the display device 230. With reference for example to FIG. 1, the direction determination component 222 may map audio frames received from participant A to an upper-left spatial direction, may map audio frames received from participant B to an upper-right spatial direction, may map audio frames received from participant C to a lower-left spatial direction, and may map audio frames received from participant D to a lower-right spatial direction.

The spatial processing component 224 is configured to transform the audio frames 202 based on the spatial directions to which they are mapped. In some aspects, the spatial processing component 224 may apply one or more transfer functions to the audio frames 202 that causes the sound waves emitted by the audio output device 240 to be perceived as originating from the spatial direction(s) associated therewith. For example, the one or more transfer functions may include one or more HRTFs. With reference for example to FIG. 1, the spatial processing component 224 may apply a respective HRTF to the audio signals provided to each of the transducers 122 and 124 so that the user perceives sound waves emitted by the audio output device 120 as originating from a particular spatial direction. As a result, the directional audio 205 may be indicative of the direction or position of the speaker on the display device 230.

In some implementations, the audio processor 220 may be configured to receive feedback 206 from a user of the videoconferencing system 200. The feedback 206 may indicate an accuracy of the spatial directions to which the audio frames 202 are mapped. With reference for example to FIG. 1, the user of the videoconferencing system 100 may detect that participant A is speaking but may perceive the speech as coming from a spatial direction associated with participant C (such as below and to the left). As such, the user may provide feedback 206 indicating that the spatial direction should be up and to the left (or otherwise in the direction of participant A). In some implementations, the audio processor 220 may adjust or fine-tune the spatial mappings based on the received feedback 206.

Figure 3:
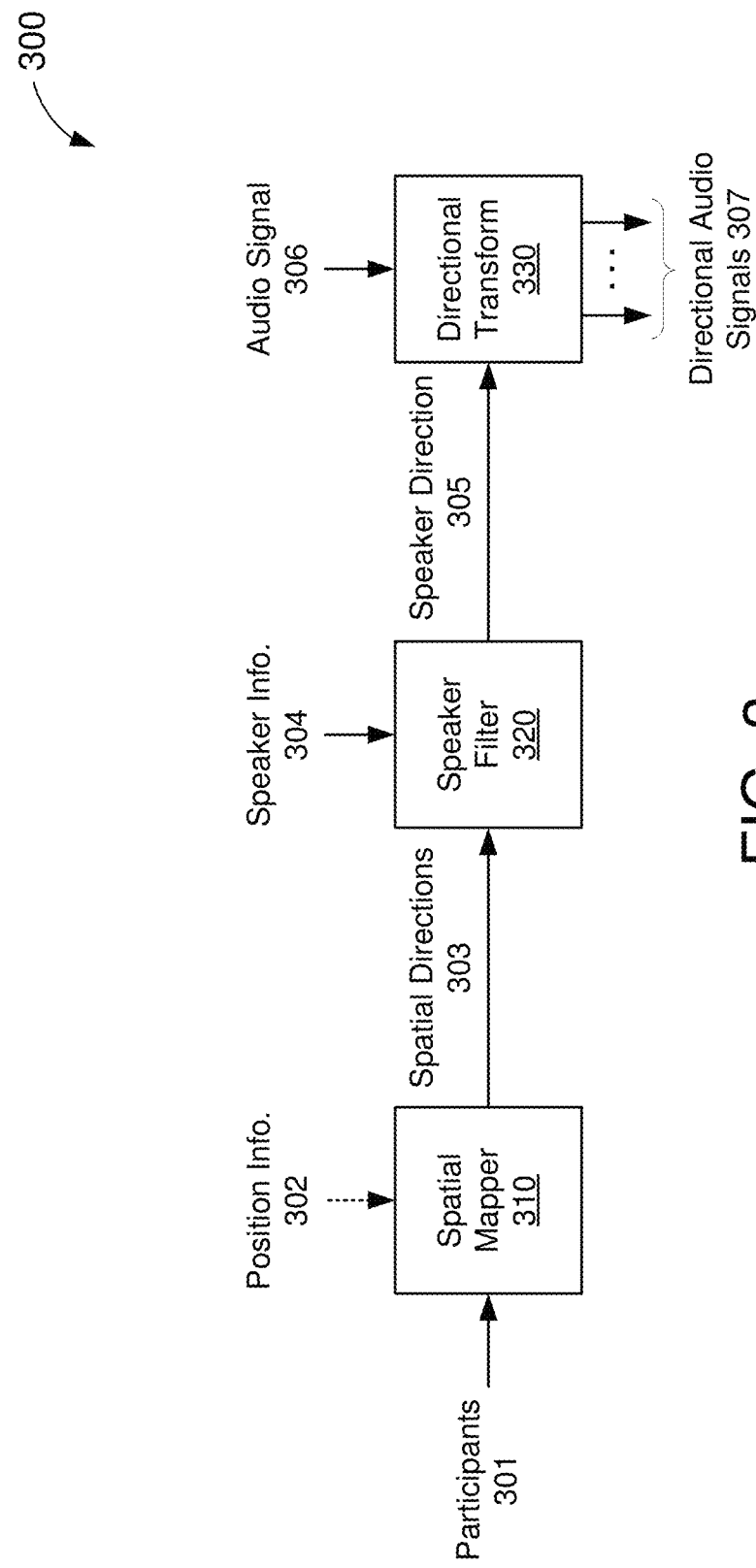
FIG. 3 shows a block diagram of an example audio signal processor, according to some implementations.

FIG. 3 shows a block diagram of an example audio signal processor 300, according to some implementations. In some implementations, the audio signal processor 300 may be one example of the audio processor 220 of FIG. 2. More specifically, the audio signal processor 300 may be configured to transform an audio signal 306, received from a speaker in a videoconference, to one or more directional audio signals 307 associated with a spatial direction. With reference for example to FIG. 2, the audio signal 306 may be one example of the audio frames 202 and the directional audio signals 307 may be one example of the directional audio 205. The audio signal processor 300 includes a spatial mapper 310, a speaker filter 320, and a directional transform 330.

The spatial mapper 310 is configured to map each participant 301 in the videoconference to a respective spatial direction 303. For example, the spatial mapper 310 may receive information from a videoconferencing application identifying each of the participants 301 in the videoconference. In some implementations, each spatial direction 303 may be associated with a respective a location on a display associated with the videoconference (such as the display device 230 of FIG. 2). For example, the spatial mapper 310 may receive position information 302 (such as from the videoconferencing application or an image processor) indicating the position of each participant 301 on the display. In some implementations, the spatial mapper 310 may perform the mapping based on a neural network model or algorithm that can infer a spatial direction from a respective position on the display. In some other implementations, the spatial mapper 310 may map the participants 301 to respective spatial directions 303 without knowledge of the positions of any of the participants 301 on the display.

The speaker filter 320 is configured to select the spatial direction 303 to which a speaker associated with the audio signal 306 is mapped. For example, the speaker filter 320 may receive speaker information 304 (such as from the videoconferencing application or an image processor) indicating which of the participants 301 is the speaker associated with the audio signal 306. The speaker filter 320 may further provide the selected spatial direction 303, as a speaker direction 305, to the directional transform 330. The directional transform 330 transforms the audio signal 306 based on one or more transfer functions associated with the speaker direction 305. More specifically, the directional transform 330 may apply the one or more transfer functions to the audio signal 306 to produce one or more directional audio signals 307. In some aspects, the one or more transfer functions may cause the directional audio signals 307 to be emitted (by an audio output device) as sound waves that are perceived to originate from the speaker direction 305.

In some implementations, the directional transform 330 may apply different transfer functions (such as HRTFs) to different audio channels associated with the audio output device. With reference for example to FIG. 1, the directional transform 330 may apply a different HRTF to the audio signals provided to each of the transducers 122 and 124. For example, to simulate sound originating from the speaker direction 305, the directional transform 330 may apply a first HRTF to a copy of the audio signal 306 to be provided to the transducer 122 and may apply a second HRTF (that is different than the first HRTF) to a copy of the audio signal 306 to be provided to the transducer 124. As a result, the directional audio signals 307 may include a first directional audio signal 307 associated with the left audio channel of the audio output device (which emits sound waves to the user's left ear) and a second directional audio signal 307 associated with the right audio channel of the audio output device (which emits sound waves to the user's right ear).

Figure 4:
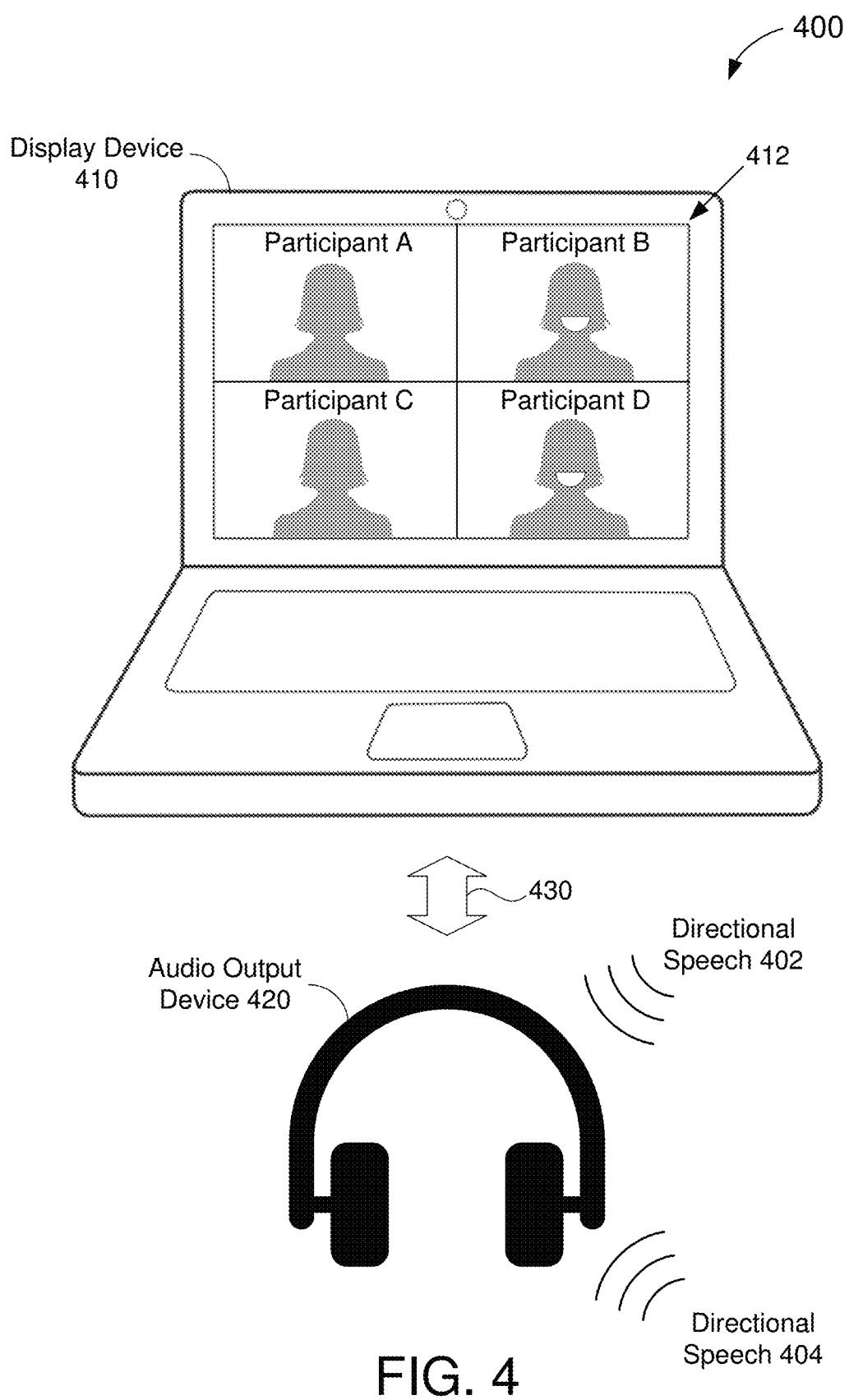
FIG. 4 shows an example videoconferencing operation with virtual sound localization.

FIG. 4 shows an example videoconferencing operation with virtual sound localization. The videoconferencing operation is performed by a videoconference system 400 that includes a display device 410 and an audio output device 420 coupled via a wired, or wireless, communication link 430. In some implementations, the videoconferencing system 400 may be one example of the videoconferencing system 200 of FIG. 2. With reference for example to FIG. 2, the display device 410 may be on example of the display device 230 and the audio output device 420 may be one example of the audio output device 240. In some implementations, the image processor 210 and the audio processor 220 may be components of the display device 410. In some other implementations, at least the audio processor 220 may be a component of the audio output device 420.

In some implementations, the display device 410 may receive video data, representing captured video, from multiple participants A—D of the videoconference and merge the captured video for display in a shared display region 412. For example, the display device 410 may display video (or images) of the participants A—D concurrently in the display region 412. As shown in FIG. 4, participant A is displayed in the upper-left of the display region 412, participant B is displayed in the upper-right of the display region 412, participant C is displayed in the lower-left of the display region 412, and participant D is displayed in the lower-right of the display region 412. In the example of FIG. 4, the videoconference is shown to include 5 participants (where the user of the videoconferencing system 400 is not depicted in the display region 412). However, in actual implementations, a videoconference may include fewer or more participants than those depicted in FIG. 4.

In the example of FIG. 4, participants B and D are speaking while participants A and C are silent. In some aspects, the audio output device 420 may output speech 402 and 404 from the participants B and D, respectively, that is perceived to originate from the direction of the speaker. For example, the speech 402 is perceived to originate from an upper-right direction and the speech 404 is perceived to originate from a lower-right direction. In some aspects, the videoconferencing system 400 may transform the audio signals received from the speakers to create the directional speech 402 and 404. With reference for example to FIG. 2, the image processor 210 may detect the speakers (as participants B and D) and indicate the position of each speaker to the audio processor 220. For example, the speech detection component 212 may monitor the lip movements of each of the participants A-D to determine that only participants B and D are speaking. Further, the position determination component 214 may determine that participant B is located in the top-right quadrant of the display region 412 and participant D is located in the bottom-right quadrant of the display region 412.

The audio processor 220 may receive audio frames 202 from each of the speakers and transform the audio frames 202 into directional audio 205 indicative of the speakers associated therewith. For example, the direction determination component 222 may map the audio frames 202 received from participant B to a first spatial direction associated with the position of participant B in the display region 412 (such as an upper-right direction) and may map the audio frames 202 received from participant D to a second spatial direction associated with the position of participant D in the display region 412 (such as a lower-right direction). Further, the spatial processing component 224 may apply one or more transform functions (such as HRTFs) associated with the first spatial direction to the audio frames 202 received from participant B and may apply one or more transfer functions (such as HRTFs) associated with the second spatial direction to the audio frames 202 received from participant D. As a result, the speech 402 is perceived to originate from a direction or location of participant B and the speech 404 is perceived to originate from a direction or location of participant D.

Figure 5:
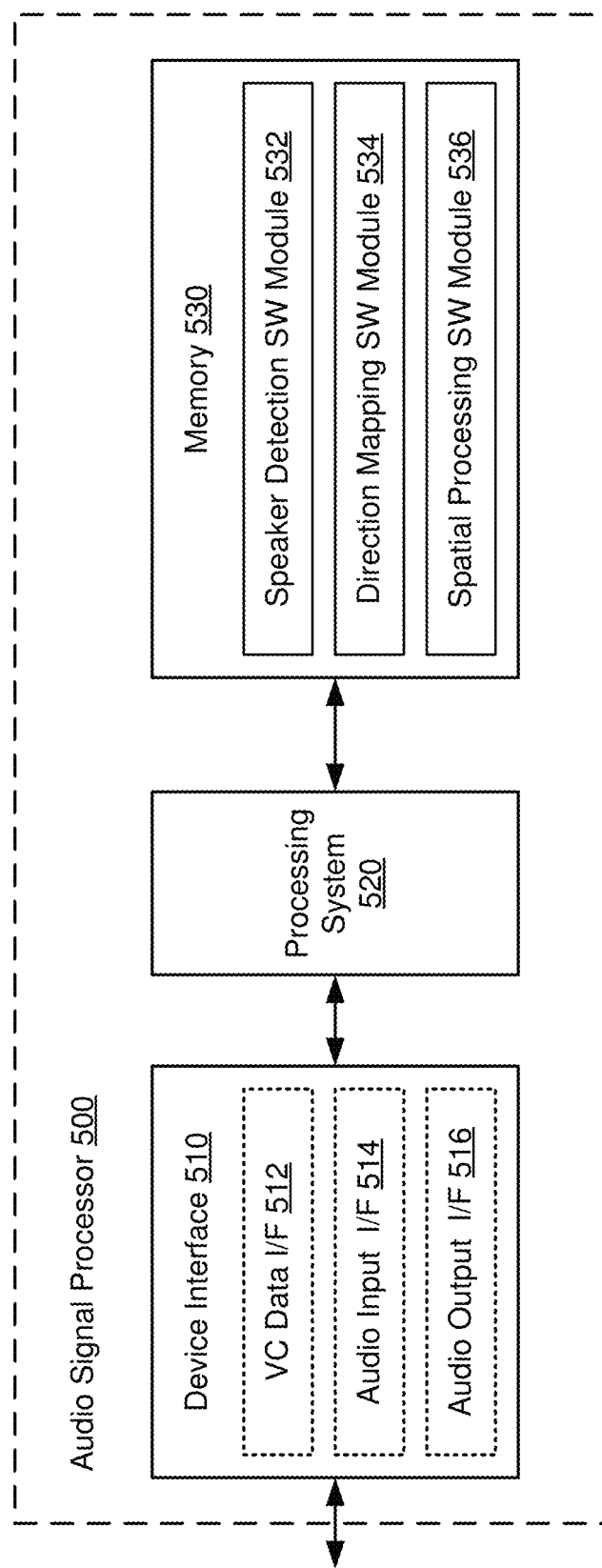
FIG. 5 shows another block diagram of an example audio signal processor, according to some implementations.

FIG. 5 shows another block diagram of an example audio signal processor 500, according to some implementations. More specifically, the audio signal processor 500 may be configured to transform audio signals received from participants in a videoconference to indicate a direction or location of each speaker. In some implementations, the audio signal processor 500 may be one example of the audio processor 220 of FIG. 2 or the audio signal processor 300 of FIG. 3. The audio signal processor 500 includes a device interface 510, a processing system 520, and a memory 530.

The device interface 510 is configured to communicate with one or more components of a videoconferencing system. In some implementations, the device interface 510 may include a videoconference (VC) data interface (I/F) 512, an audio input interface 514, and an audio output interface 516. The VC data interface 512 may receive information associated with one or more participants in the videoconference; the audio input interface 514 may receive the audio signals associated with the videoconference; and the display interface 516 may output transformed audio signals to an audio output device (such as the audio output device 240 of FIG. 2).

The memory 530 may include a non-transitory computer-readable medium (including one or more nonvolatile memory elements, such as EPROM, EEPROM, Flash memory, or a hard drive, among other examples) that may store at least the following software (SW) modules:
  a speaker detection SW module 532 to detect a speaker associated with the received audio signal, where the speaker is one of the participants in the videoconference;
  a direction mapping SW module 534 to map the speaker to a spatial direction; and
  a spatial processing SW module 536 to transform the received audio signal based on one or more transfer functions associated with the spatial direction.

Each software module includes instructions that, when executed by the processing system 520, causes the audio signal processor 500 to perform the corresponding functions.

The processing system 520 may include any suitable one or more processors capable of executing scripts or instructions of one or more software programs stored in the audio signal processor 500 (such as in memory 530). For example, the processing system 520 may execute the speaker detection SW module 532 to detect a speaker associated with the received audio signal, where the speaker is one of the participants in the videoconference. The processing system 520 also may execute the direction mapping SW module 534 to map the speaker to a spatial direction. Further, the processing system 520 may execute the spatial processing SW module 536 to transform the received audio signal based on one or more transfer functions associated with the spatial direction.

Figure 6:
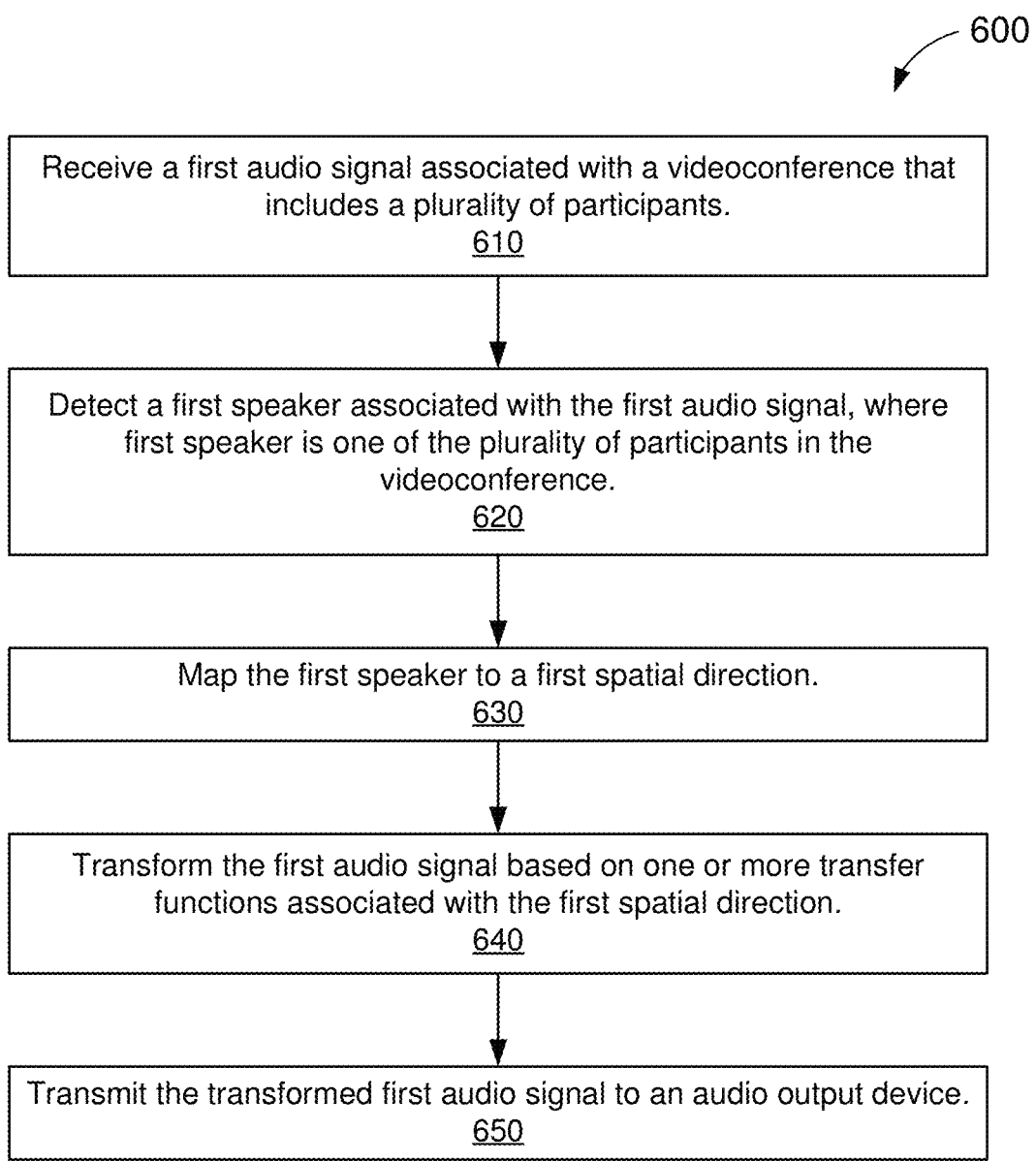
FIG. 6 shows an illustrative flowchart depicting an example operation for processing audio signals, according to some implementations.

FIG. 6 shows an illustrative flowchart depicting an example operation 600 for processing audio signals, according to some implementations. In some implementations, the example operation 600 may be performed by a videoconferencing system such as any of the videoconferencing systems 100, 200, or 400 of FIGS. 1, 2, and 4, respectively.

The videoconferencing system may receive a first audio signal associated with a videoconference that includes a plurality of participants (610). The videoconferencing system may detect a first speaker associated with the first audio signal, where the first speaker is one of the plurality of participants in the videoconference (620). The videoconferencing system may map the first speaker to a first spatial direction (630). The videoconferencing system may further transform the first audio signal based on one or more transfer functions associate with the first spatial direction (640). The videoconferencing system may transmit the transformed first audio signal to an audio output device (650).

In some aspects, the mapping of the first speaker to the first spatial direction may include determining a position of the first speaker on a display associated with the videoconference, the position of the first speaker being associated with the first spatial direction. In some implementations, the videoconferencing system may receive position information indicating a relative position of each of the plurality of participants on the display. In some other implementations, the videoconferencing system may receive video frames associated with the videoconference and determine the position of the first speaker based at least in part on the received video frames.

In some aspects, the detecting of the first speaker associated with the first audio signal may include receiving video frames associated with the videoconference and performing an image processing operation on the received video frames that identifies the first speaker associated with the first audio signal.

In some aspects, the one or more transfer functions include an HRTF that causes sound waves emitted by the audio output device to be perceived as originating from the first spatial direction. In some aspects, the one or more transfer functions include a first transfer function associated with a left audio channel of the audio output device and a second transfer function associated with a right audio channel of the audio output device, the first transfer function being different than the second transfer function.

In some aspects, the videoconferencing system may receive feedback associated with the first audio signal and adjust the one or more transfer functions based on the received feedback.

In some aspects, the videoconferencing system may further receive a second audio signal associated with the videoconference; detect a second speaker associated with the second audio signal, where the second speaker is one of the plurality of participants different than the first speaker; map the second speaker to a second spatial direction different than the first spatial direction; transform the second audio signal based on one or more transfer functions associated with the second spatial direction; and transmit the transformed second audio signal to the audio output device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing audio signals, comprising:
receiving a first audio signal associated with a videoconference that includes a plurality of participants;
detecting a first speaker associated with the first audio signal, the first speaker being one of the plurality of participants in the videoconference;
receiving position information indicating a relative position of each of the plurality of participants on a display;
determining a position of the first speaker on the display based on the received position information;

mapping the first speaker to a first spatial direction associated with the position of the first speaker on the display;

transforming the first audio signal based on one or more transfer functions associated with the first spatial direction; and transmitting the transformed first audio signal to an audio output device.

2. The method of claim 1, wherein the determining of the position of the first speaker comprises:

receiving video frames associated with the videoconference, the position of the first speaker being determined based at least in part on the received video frames.

3. The method of claim 1, wherein the detecting of the first speaker associated with the first audio signal comprises:

receiving video frames associated with the videoconference; and performing an image processing operation on the received video frames that identifies the first speaker associated with the first audio signal.

4. The method of claim 1, wherein the one or more transfer functions include a head-related transfer function (HRTF) that causes sound waves emitted by the audio output device to be perceived as originating from the first spatial direction.

5. The method of claim 1, wherein the one or more transfer functions include a first transfer function associated with a left audio channel of the audio output device and a second transfer function associated with a right audio channel of the audio output device, the first transfer function being different than the second transfer function.

6. The method of claim 1, further comprising:

receiving feedback associated with the first audio signal; and adjusting the one or more transfer functions based on the received feedback.

7. The method of claim 1, further comprising:

receiving a second audio signal associated with the videoconference;

detecting a second speaker associated with the second audio signal, the second speaker being one of the plurality of participants different than the first speaker;

mapping the second speaker to a second spatial direction different than the first spatial direction;

transforming the second audio signal based on one or more transfer functions associated with the second spatial direction; and transmitting the transformed second audio signal to the audio output device.

8. A videoconferencing system, comprising:

a processing system; and a memory storing instructions that, when executed by the processing system, causes the videoconferencing system to:

receive a first audio signal associated with a videoconference that includes a plurality of participants;

detect a first speaker associated with the first audio signal, the first speaker being one of the plurality of participants in the videoconference;

receive position information indicating a relative position of each of the plurality of participants on a display;

determine a position of the first speaker on the display based on the received position information;

map the first speaker to a first spatial direction associated with the position of the first speaker on the display;

transform the first audio signal based on one or more transfer functions associated with the first spatial direction; and transmit the transformed first audio signal to an audio output device.

9. The videoconferencing system of claim 8, wherein the determining of the position of the first speaker comprises:

receiving video frames associated with the videoconference, the position of the first speaker being determined based at least in part on the received video frames.

10. The videoconferencing system of claim 8, wherein the detecting of the first speaker associated with the first audio signal comprises:

receiving video frames associated with the videoconference; and performing an image processing operation on the received video frames that identifies the speaker associated with the received audio signal.

11. The videoconferencing system of claim 8, wherein the one or more transfer functions include a head-related transfer function (HRTF) that causes sound waves emitted by the audio output device to be perceived as originating from the first spatial direction.

12. The videoconferencing system of claim 8, wherein the one or more transfer functions include a first transfer function associated with a left audio channel of the audio output device and a second transfer function associated with a right audio channel of the audio output device, the first transfer function being different than the second transfer function.

13. The videoconferencing system of claim 12, wherein the audio output device is a stereo headset.

14. The videoconferencing system of claim 8, wherein execution of the instructions further causes the videoconferencing system to:

receive a second audio signal associated with the videoconference;

detect a second speaker associated with the second audio signal, the second speaker being one of the plurality of participants different than the first speaker;

map the second speaker to a second spatial direction different than the first spatial direction;

transform the second audio signal based on one or more transfer functions associated with the second spatial direction; and transmit the transformed second audio signal to the audio output device.

15. A videoconferencing system comprising:

a display device configured to display a videoconference that includes a plurality of participants;

an audio output device configured to emit sound waves based on audio signals associated with the videoconference; and an audio signal processor configured to:

receive a first audio signal associated with the videoconference;

detect a first speaker associated with the first audio signal, the first speaker being one of the plurality of participants in the videoconference;

receive position information indicating a relative position of each of the plurality of participants on the display device;

determine a position of the first speaker on the display based on the received position information;

map the first speaker to a first spatial direction associated with the position of the first speaker on the display device;

transform the first audio signal based on one or more transfer functions associated with the first spatial direction; and provide the transformed first audio signal to the audio output device.

16. The video conferencing system of claim 15, wherein the audio signal processor is further configured to:

receive a second audio signal associated with the videoconference;

detect a second speaker associated with the second audio signal, the second speaker being one of the plurality of participants different than the first speaker;

map the second speaker to a second spatial direction different than the first spatial direction;

transform the second audio signal based on one or more transfer functions associated with the second spatial direction; and provide the transformed second audio signal to the audio output device.

* * * * *